United States Patent
Zehler et al.

(10) Patent No.: US 10,187,549 B2
(45) Date of Patent: Jan. 22, 2019

(54) SYSTEM AND METHOD FOR PRINTING DOCUMENTS USING PRINT HARDWARE AND AUTOMATIC PRINT DEVICE IDENTIFICATION BASED ON CONTEXT CORRELATION

(71) Applicant: Xerox Corporation, Norwalk, CT (US)

(72) Inventors: Peter J. Zehler, Penfield, NY (US); Lawrence W. Meyer, Fairport, NY (US); Erol Esen, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/788,014

(22) Filed: Oct. 19, 2017

(65) Prior Publication Data

US 2018/0041662 A1    Feb. 8, 2018

Related U.S. Application Data

(62) Division of application No. 14/972,603, filed on Dec. 17, 2015, now Pat. No. 9,826,121.

(51) Int. Cl.
| | |
|---|---|
| *H04N 1/44* | (2006.01) |
| *H04N 1/00* | (2006.01) |
| *G06K 9/00* | (2006.01) |

(52) U.S. Cl.
CPC ....... *H04N 1/4413* (2013.01); *G06K 9/00442* (2013.01); *H04N 1/00307* (2013.01); *H04N 2201/0094* (2013.01)

(58) Field of Classification Search
CPC .................................................... H04N 1/4413

USPC ........................................................ 358/1.14
See application file for complete search history.

(56) References Cited

U.S. PATENT DOCUMENTS

| | | | |
|---|---|---|---|
| 7,213,048 B1 | 5/2007 | Parupudi et al. | |
| 7,880,912 B2 | 2/2011 | Eldridge | |
| 8,330,980 B2 | 12/2012 | Sorrentino et al. | |
| 2006/0238799 A1 | 10/2006 | Kidokoro | |
| 2007/0024580 A1 | 2/2007 | Sands et al. | |
| 2010/0214614 A1 | 8/2010 | Ferlitsch et al. | |
| 2010/0332980 A1* | 12/2010 | Sun ..................... G06F 3/04815 715/706 |
| 2014/0055812 A1* | 2/2014 | DeRoller ........... H04N 1/00854 358/1.15 |
| 2016/0277638 A1* | 9/2016 | Mochizuki ........... H04N 1/4426 |

* cited by examiner

*Primary Examiner* — Jacky X Zheng
(74) *Attorney, Agent, or Firm* — Fox Rothschild LLP (57) ABSTRACT

A method for printing a document from a mobile device includes identifying a document to be printed and generating a notification comprising a selection of at least one candidate print device that may be selected for printing. The notification may be generated by analyzing, by one or more mobile device applications, the document to be printed to identify a document context including a security level of the identified document; using data sensed by one or more mobile device sensors to identify a user context including at least a current geographical location of the user; using the user context to detect a print device near the geographical location of the user; and accessing a rule set to determine if the identified document can be printed on the detected print device based on the security level of the identified document; and causing a user interface to output the notification.

16 Claims, 3 Drawing Sheets

SYSTEM AND METHOD FOR PRINTING DOCUMENTS USING PRINT HARDWARE AND AUTOMATIC PRINT DEVICE IDENTIFICATION BASED ON CONTEXT CORRELATION

CROSS-REFERENCE TO RELATED APPLICATIONS

This application claims priority to and is a divisional of U.S. patent application Ser. No. 14/972,603 filed Dec. 17, 2015, the disclosure of which is incorporated herein by reference in its entirety.

BACKGROUND

Mobile devices such as smartphones, notebook and laptop computers, PDAs (personal digital assistants), tablet computing devices, and so forth, are extremely ubiquitous, and are extensively used to provide convenient storage and/or printing of various documents and data. Such devices are able to store the documents and data of the user, and allow the user to access such information in many different locations. When users with such mobile devices wish to print documents, files or other information stored on the mobile devices, information is transmitted via a print aware mobile application to a print device directly or through an intermediate processing device.

Often times, a print device may not be available in the vicinity of the user, and the mobile device may store documents in a print queue related to a set of print devices (such as a network of print devices at a user's work place or home). Hence, current print solutions only provide an automatic "print device available" notification for printing documents in the print queue when the mobile device is in the vicinity of a print device in the set of print devices. However, such initial binding of the document to a set of print devices limits the user's ability to automatically route or print documents at other print devices.

Moreover, data and/or documents stored on a mobile device may include confidential or other types of information that can only be printed at certain print locations and/or print devices that further limit user's print options based on the initial binding.

The current disclosure discloses a system and method to determine the context of a user, a document, and a print device to automatically select a print device for printing a document in a print queue from mobile devices.

SUMMARY

In one aspect, the disclosure describes a system (and method) for printing a document from a mobile device. The system may include a non-transitory, computer readable memory; one or more processors; and a computer-readable medium containing programming instructions that, when executed by the one or more processors, cause the system to: identify a document to be printed, and generate a notification including a selection of at least one candidate print device that may be selected for printing the document. In an embodiment, generating the notification may include using data obtained from the mobile device to identify a document context associated with the identified document and a user context, using the user context to detect a print device, using at least the document context to determine if the document can be printed on the detected print device, generating the notification including the selection of at least one candidate print device that may be selected for printing the document, by including the detected print device in the selection of at least one candidate print device, and causing a user interface to output the notification. The data obtained from the mobile device may include data sensed by one or more sensors of the mobile device, and/or data gathered by one or more mobile applications of the mobile device. Alternatively and/or additionally, the system may save the document and the document context associated with the document to a client print queue, if the document cannot be printed on the detected print device.

In at least one embodiment, the document context may include at least a security level of the identified document, and the user context may include at least a current geographical location of the user. Alternatively and/or additionally, the print device may be detected based on the user location (for e.g., one or more print devices within a pre-determined distance of the user location) and the determination of whether or not the document can be printed on the detected print device may be based on the security level of the identified document. In an embodiment, the document context may also include a printing policy for the document and the determination of whether or not the document can be printed on the detected print device may further be based on the printing policy of the identified document. The printing policy may include a listing of locations where the identified document can be printed. The location of the user may be identified based on context information relating to at least one of the following: a geographical location of the user, user preference information, user print history data, user profile, or user identity. In an embodiment, context information relating to a geographical location of the mobile device may be identified using one or more location tracking sensors of the mobile device (one or more sensors associated with a global positioning system, one or more sensors associated with a Wi-Fi based positioning system, one or more sensors associated with a micro-location sensor, and/or one or more imaging sensors) to sense the location of the mobile device, and/or by receiving data from a calendar application of the mobile device and using the data to identify the location of the mobile device. Additionally and/or alternatively, the mobile device may determine the location using data captured by a positional sensor of the mobile device to detect the location of the mobile electronic device, using an identifier of network to which the mobile device is connected, and/or using a micro-location technique of the mobile device.

In an embodiment, the user may provide an identification of the document to be printed to the mobile device. The system may thus automatically determine a print device location automatically based on user location for printing the user-identified document (without further user input).

In at least one embodiment, the system may identify the document context by identifying an intended use of the document by identifying a format of the identified document and accessing the rule set to identify an intended use based on the identified format, and/or identifying a folder name of a folder associated with the identified document and accessing the rule set to identify an intended use based on the folder name. Alternatively and/or additionally, the system may analyze the document to be printed to identify a document context by identifying a plurality of keywords in the identified document and using the plurality of keywords to identify the document context (such as security level) of the identified document.

In an embodiment, the user context may include context information relating to user preference information, user print history data, user profile, and/or user identity. In an embodiment, the system may identify the document context using previous user selection or preferences.

In at least one embodiment, the system may further detect a threshold change in the user context, update the user context to a new user context, use the new user context to detect a first print device, for each document in the client print queue, determine, whether the document can be printed on the first print device using at least a document context for each document, and generate the notification comprising the selection of at least one candidate print device that may be selected for printing the document, by including the first print device and an identification of at least one document that can be printed on the first print device in the selection of at least one candidate print device. In an embodiment, detecting a threshold change in the user context may include detecting a threshold change in the geographical location of the user.

In some embodiment, the system may also obtain print device data at the mobile device, use the print device to identify print device context associated with the detected print device, and use the print device context to determine if the document can be printed on the detected print device. Print device context may be identified by identifying information relating to one or more capabilities of the print device, a geographical location of the print device, user print history data corresponding to the print device, information relating to one or more print device connectivity settings, and/or print device network information. Additionally and/or alternatively, using the print device context to determine if the document can be printed on the detected print device may include using the information relating to one or more capabilities of the print device to determine whether the print device is capable of printing the document. In at least one embodiment, the system may also determine whether the document context allows the document to be printed at the geographical location of the print device, and/or within a network of the print device.

In some embodiments, identifying the document context may include identifying context information relating to at least one of the following: an intended use of the document, a location of the document in the mobile device, a type of the document, metadata associated with the document, or at least one keyword in the document.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

A "mobile device" or "mobile electronic device" refers to a portable computing device that includes short range wireless communication interface such as a transmitter, a near field communication (NFC) or radio frequency identifier (RFID) tag or Bluetooth/Bluetooth Low Energy (BT/BLE) receiver, a processor and non-transitory, computer-readable memory. The memory may contain programming instructions in the form of a software application that, when executed by the processor, cause the device to perform one or more document operations. Examples of suitable portable electronic devices include smartphones, personal digital assistants, cameras, tablet devices, electronic readers, personal computers, media players, satellite navigation devices and the like.

A "print device" refers to a device that includes a print engine for printing a document. The print device may also include a wireless communication (such as NFC) interface used to communicate with one or more other devices, a processor that can process the document and a memory unit for storage of the documents or portions of the document. Any suitable print device can be used including, but not limited to, inkjet and laser print devices, copiers, multifunction devices, and the like.

The term "document" refers to a writing that provides information, the writing including text and/or images. The term "document" may include a text file, a Web page, a newsgroup posting, a picture, media, hyperlinks, etc. The document may, for example, include several areas consisting of text, and other areas consisting of images or graphics. The text, for example, may include narrative sections of some length, as well as titles and captions.

The term "context" refers to a specific situation and/or an event corresponding to a user, a document, and/or a print device at any given point in time. Context may include one or more types of context information. The types of context may include, without limitation include user context, document context, and/or print device context. User context specifies the context corresponding to the user of the mobile device. Examples of different types of user context information may include, without limitation: geographic location of a user; internet network and/or telephone network connected to the user's mobile device; identity of a user and profile information; user preference information; and time information; or a combination thereof. Document context specifies the context corresponding to the document to be printed (a document in a client print queue). In an embodiment, the document context may relate to a security level of a document and related printing policy. Examples of different types of document context information may include, without limitation: intended use of the document (such as business use or personal use); type of document itself; keywords in the document; location of the document on the mobile device; metadata of the document; or a combination thereof. Print device context specifies the context corresponding to a print device. Examples of different types of print device context information may include, without limitation: printer capabilities; geographic location of a printer; user print history data corresponding to the print device; print device connectivity settings; or a combination thereof.

A "sensing module" refers to a set of programming instructions that when executed automatically sense and/or read information (or data), for identification of context information, from mobile device sensors or applications, information contained within the mobile device itself, and/or using remote applications. For example, the sensing module may interact with the location tracking sensors, of the mobile device, such as a global positioning system transmitter, Wi-Fi triangulation, and micro-location sensors (e.g., hotpots, beacons, tags, transmitters) to determine the location of a user. The sensing module may also interface with other mobile applications such as the calendar application, social media applications, profile settings, etc. to gather data for identifying the context information (as discussed below). The sensing module may interact with document processing applications, such as document folders, documents viewers, document parsing application; etc. to identify document context information. The sensing module may also interact with print devices and/or use information stored on the mobile device/remotely to identify print device context information.

Figure 1:
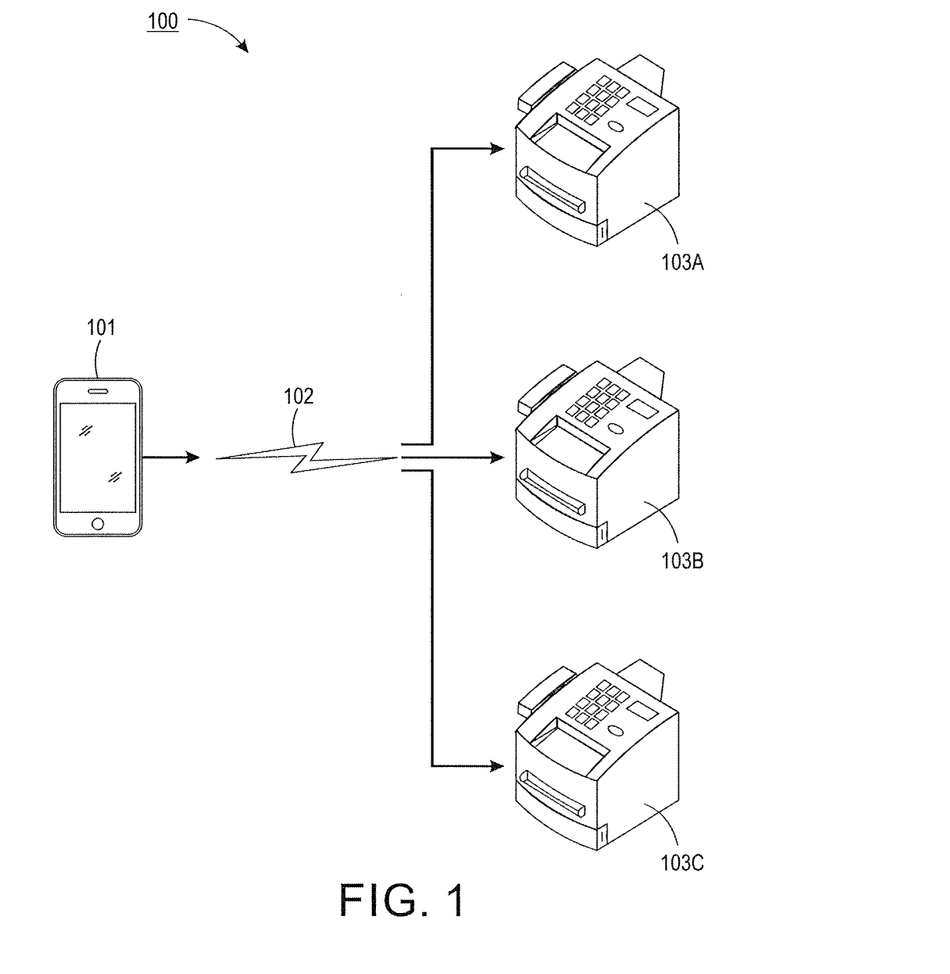
FIG. 1 is a schematic illustration of a system for achieving print functionality according to an embodiment.

FIG. 1 shows an example system for automatic print device identification from a set of print devices based on context correlation. The system may include a mobile device 101 that can communicate with any number of print devices 103a, 103b, and 103c via a communications link 102. The communications link 102 may be the Internet, an intranet, a local area network, a wide area network, a proximity enabled link (such as short range communications like near field communication "NFC", Bluetooth, etc.) or any communication system over which the mobile device 101 may communicate with one or more of the print devices 103a, 103b, and 103c. In some embodiments, the communications link may also involve a secondary communications link between the mobile device 101 and the print device (e.g., 103a) in addition to an initial handshake link. For example, in an embodiment, a proximity enabled communications link like NFC may be operable to initiate a direct or indirect network connection between an NFC enabled device (e.g., the mobile device 101) and a print device (e.g., 103a). For example, a specially encoded NFC tag of a print device 103 may respond to a field generated by another NFC enabled device by providing information that identifies network information about the print device (e.g., Bluetooth® address, IP address, MAC address, or the like). In this regard, the print device's NFC tag may transmit a print device identifier for receipt by, for example, the mobile device 101. The mobile device 101 may be configured to identify the print device identifier as being associated with a print device and to launch an application that may begin the process of pairing the mobile device 101 with the print device (e.g., 103a) using the received network information. Upon establishing a secondary higher speed link, the print device (e.g., 103a) may be configured to send/receive data to/from the mobile device 101 to perform various tasks via the higher speed link.

In this document, the terms "print application" and "print software" refer to a software application that is configured to cause an electronic device to perform some or all of the print-related functions that are described in this disclosure.

Figure 2:
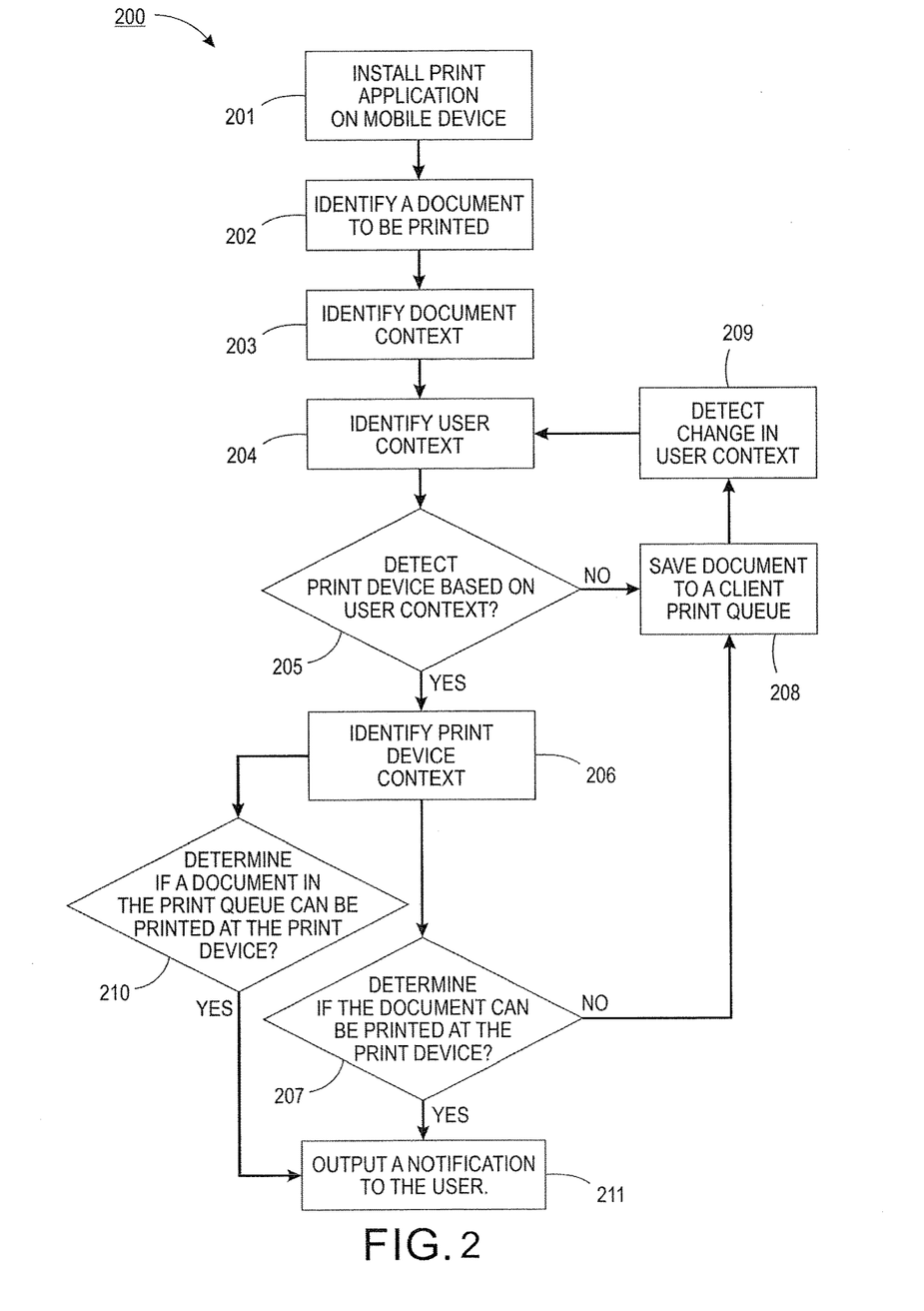
FIG. 2 depicts a flow chart example of a process for automatically identifying a print device based on context correlation, according to an embodiment.

FIG. 2 depicts a flow chart example of a process for automatically identifying a print device for printing a document using context correlation. To begin with, the user of a mobile device may download and install a print application onto the mobile device in step 201. The user may acquire the application by downloading it from an application store or from a print service provider, or by other acquisition methods. In certain embodiments, the print application may be pre-installed on the mobile device. The print application may include virtually any application type which may run on any underlying operating system or platform. The installed print application may register itself with the mobile device's operating system allowing the application to monitor certain activities on the mobile device's operating system, and using the functionalities of the operating system. The print application may also operate to identify and customize a document to be printed on the mobile device as discussed later.

The print application may be a local application which executes on the mobile device. Alternatively, the print application may be a web application which executes on a remote application server. That is, the print application may include any application functionality which is accessed by the user over a network and experienced locally as application e.g., using a browser running on the mobile device. Techniques for executing such a web application, and related technology, are well known in the art and are therefore not described further in detail herein, except as may be helpful or necessary to understand operations of the system. In other embodiments, the print application may include both local and web (remote) elements.

In step 202, the print application may identify a document to be printed via the mobile device. In some embodiments, the user may provide a command identifying the document to be printed by entering a selection of the document into a user interface of the mobile device. Alternatively and/or additionally, the mobile application may automatically identify the document to be printed by detecting a most recent triggering event with respect to a document, and identify the corresponding document as the document to be printed by comparing the time of detection of the triggering event with a threshold time.

The print application may then identify document context 203 for the document to be printed. The identified document context may include one or more types of document context information. As discussed above, examples of document context information may include, without limitation, intended use of the document (such as business use or personal use); type of document itself; keywords in the document; location of the document on the mobile device; metadata of the document; or a combination thereof. In some embodiments, the mobile application may allow the user to select one or more types of context information to be included in the identified context (and used in the identification of document context). In certain other embodiments, the mobile application may identify the types of context information to be included in the identified context based on past user actions (discussed below).

In an embodiment, the system may receive some or all of the document context information from a user of the mobile device, via one or more user interface of the mobile device (such as a keypad, a touch screen with input sectors, a voice command interface, etc.).

In certain other embodiments, the print application may automatically identify some or all the document context information. The print application may utilize the sensing module to receive data or information from various sensors and mobile applications, and determine the context information based on the obtained data. The sensing module may employ any suitable available mechanisms (such as sensors, and mobile applications) for obtaining data for identification of context information. In an embodiment, the mechanisms for obtaining information for identification of context information may depend on, without limitation, the type of data or information, type of context information, type of document (e.g., pdf, word, text, image, etc.) the mobile device capabilities, and other such parameters.

In an embodiment, the sensing module may obtain data for identifying document context information regarding the intended use of the document to be printed, by interfacing with the mobile device applications and sensors. For example, the sensing module may identify data relating to the format of the document to be printed by first identifying the mobile application used to store, read, open, and/or otherwise process the document, and then using the identified format to identify an intended use based on rules or logic. For example, in an embodiment, the sensing module may use logic specifying that documents in power point presentation formats and/or word formats are business related documents, documents that include a photo are personal documents, documents stored in a photo album are personal documents, documents retrieved from a work email are business related documents, and/or documents retrieved from a personal email are personal documents. In an embodiment, the name of the folder in which a document is stored may be used to automatically identify the intended use by identifying keywords in the folder names. For example, the user of a mobile device may store documents in folders labeled with names containing the following keywords: "personal," "health," "financial," "work," etc. and the folders labels may be used to infer the intended use of the document. The above folder names and keywords are provided by way of example only, and other keywords and folder names are within the scope of this disclosure.

Alternatively and/or additionally, the sensing module may interface with a mobile application to parse the contents of the application, identify the source of the document, and/or receive other similar data in order to determine keywords in the document. For example, in an embodiment, the sensing module may use now or hereafter known keyword searching methods to parse the document data to identify keywords in the document. Example keywords may include, without limitation, confidential, health, financial, account, personal, company name (for the user of the mobile device), PIN, password, etc. The above keywords are provided by way of example only, and other keywords are within the scope of this disclosure.

Similarly, the sensing module may use a mobile application to extract metadata relating to the document. Document metadata in a Word document, for example, may include the file size, date of document creation, the names of the author and most recent modifier, the dates of any changes and the total edit time. Further metadata can be added, including title, tags and comments such as print instructions, security level, etc.

The sensing module may then determine the document context by processing some or all of the above context information. As discussed above, in an embodiment, document context may be the security level of a document and associated printing policy. Different security levels may be assigned to documents based on the identified: intended use, presence or absence of keywords, folder (and/or folder name) of the document, document format, and/or metadata of the document. For example, a document stored in a personal folder may be assigned a lower security level (i.e., less security measures needed) and a document stored in a business folder may be assigned a higher security level (i.e., more security measures needed). Similarly, documents and/or folder names containing keywords such as confidential, health, financial, account, PIN, password, personal, etc. may be assigned a higher security level, or stored in folders having names containing the above keywords, may be assigned a higher security level. In yet another embodiment, folder of the document, format of the document and/or metadata may also be used to determine the security levels of the document. For example, a document (and/or the folder where the document is stored) having an associated password and/or redacted information with it may be may be assigned a higher security level.

In an embodiment, the security levels may be associated with one or more printing policies. In an embodiment, the printing policy may define the location and/or the network of print devices where the document may be printed. In an embodiment, the print policy may further provide the print device (s) identification that may be used for printing the document. For example, in an embodiment, if the security levels are defined as high, medium, and low, a printing policy may provide that high security level documents may only be printed at the user's home or business geographical location and may also specify the print device that may be used for printing, medium security level documents may only be printed at the user's home or business geographical location and/or network (without specifying the particular print devices), and low security level documents may be printed at any geographical location and/or print device. The print policy may also provide the classification policy for classifying the documents as high, medium, or low security level documents based on the identified context information. It will be understood to those skilled in the art that the above printing policy and classification is provided only for exemplary purposes, and various other embodiments are within the scope of this disclosure.

The print application also operates to automatically identify user context in step 204. The identified user context may include one or more types of context information. As discussed above, User context information specifies the context corresponding to the user of the mobile device. Examples of different types of user context information may include, without limitation, geographic location of a user; internet network and/or telephone network connected to the user's mobile device; identity of a user and profile information; user print history data; user preference information; and time information; or a combination thereof. In some embodiments, the print application may allow the user to select one or more types of context information to be used in identifying user context. In certain other embodiments, the print application may identify the types of context information to be used in identifying user context based on past user actions (discussed below).

In an embodiment, the system may receive some or all of the user context information from a user of the mobile device, via one or more user interface of the mobile device (such as a keypad, a touch screen with input sectors, a voice command interface, etc.).

As discussed above, with respect to identifying the document context, the print application may utilize the sensing module to receive data or information from various sensors and mobile applications, and determine the context information based on the obtained data. The sensing module may employ any suitable available mechanisms (such as sensors, and mobile applications) for obtaining data for identification of context information. In an embodiment, the mechanisms for obtaining information for identification of context information may depend on, without limitation, the type of data or information (e.g., location, time), type of context information, the mobile device capabilities, the type of communication link between the mobile device and the print device, and other such parameters.

For example, in an embodiment, the sensing module may use a location tracking sensor to obtain data relating to the geographic location of a user, which may be used for identifying context information relating to a user's geographic location. The sensing module may employ various location sensors of the mobile device such as global positioning system of the mobile device, Wi-Fi based positioning system (Wi-Fi triangulation), or micro-location techniques using tags, beacons, hotspots, transmitters, in order to receive information relating to the geographic location of a user. In certain other embodiments, the sensing module may determine the location of a user by using a network receiver application of the mobile device to identify the address and location of a connected Wi-Fi or a mobile communication network. Alternatively and/or additionally, the sensing module may determine the location of a user by accessing calendar entries stored in a calendar application (and/or travel organizer applications) of the mobile device, and correlating the calendar entries to the time of printing. In an embodiment, location of the user may be determined using ceiling images from a camera associated with a user's mobile device and/or down facing images of a multifunction device. The above embodiments are provided by way of example only and the sensing module may use other location identification technologies known in the art. Such a location determination may be set to any granularity level of location region, including by country, province, state, county, city, municipality, neighborhood, a customized region (e.g., configured by the user interacting with a user interface element), or any other location region.

In another embodiment, the sensing module may obtain data for identifying context information for user-profile by interfacing with one or more mobile applications that may include such information. Examples of such mobile applications may include, without limitation, social media applications such as Facebook, Twitter, and WhatsApp; cloud sourcing applications such as Yelp and Pinterest; the operating server of the mobile device for accessing information provided by the user (profile settings, language selections, etc.); communication applications (email, messaging, etc.), and other similar means. The sensing module may process the above to data to determine context information relating to the user's profile such as determine, without limitation, the user's home location (based on social media information, etc.), user's occupation and work location, user preferences relating to document context (such as security levels and/or privacy policies), previous print devices used by the user to documents using the mobile device or other electronic devices, and other such information.

The print application may then use the identified context information to determine user context such as user location at a current or future time.

In step 205, the print application may use the user context to detect a print device(s) based on the user context (location of the user). In an embodiment, the print application may detect a print device(s) from a database of print devices accessible to the print application (stored remotely or locally on the mobile device). Examples may include, without limitation, print devices on a user's home network and/or location, print devices on a user's work network and/or location, and/or any other print devices in a public location, previously used by the user to documents. For example, in an embodiment, the print device may use the location of the user to detect a print device by identifying one or more print devices that may be located in a predetermined vicinity radius. The print application may use now or hereafter known techniques to identify the proximate print devices from the database of print devices.

Alternatively and/or additionally, the print application may detect a new print device(s) (not in the database of print devices), in the user's proximity, using one or more sensors of the mobile device and the new print device. For example, in an embodiment, the mobile device may be in a "wake on NFC" mode. In this mode, the NFC interface of the mobile device may remain inactive until the NFC interface receives an NFC signal from another NFC interface. At the same time, NFC interface of the print device may be in a host mode. In the host mode, the NFC interface of the print device may periodically emit NFC signals to seek out other nearby NFC interfaces. The NFC interface the mobile device may receive the ping message, and interpret it to identify a proximate print device. Alternatively and/or additionally, a public network including print devices may broadcast a list of available print devices, which the mobile device may receive when it is within a receiving range of the broadcast and/or if it connects to the public network. In yet another embodiment, the mobile application may access an information source, such as a website associated with the user's location (e.g., library) to identify available print devices. Other detection methods such as discovery protocol and name service look methods are possible.

If a print device(s) is not detected in step 205, than the print application may store 208 the document to be printed (and the associated document context) in a client print queue locally and/or remotely. In an embodiment, the print application may sort the documents in the client print queues, based on document context, into one or more sub-queues.

If a print device(s) is detected in step 205, the print application may identify 206 the print device context. As discussed above, examples of different types of print device context information may include, without limitation, print device capabilities; geographic location of a print device; user print history data corresponding to the print device; print device connectivity settings; print device network information; or a combination thereof.

In some embodiments, the print application may allow the user to select one or more types of context information to be used in identifying user context. In certain other embodiments, the print application may identify the types of context information to be used in identifying user context based on past user actions (discussed below).

In an embodiment, the system may receive some or all of the print device context information from a user of the mobile device, via one or more user interface of the mobile device (such as a keypad, a touch screen with input sectors, a voice command interface, etc.).

As discussed above, with respect to identifying the document context, the print application may utilize the sensing module to receive data or information from various sensors and mobile applications, and determine the print device context information based on the obtained data. The sensing module may employ any suitable available mechanisms (such as sensors, and mobile applications) for obtaining data for identification of context information. In an embodiment, the mechanisms for obtaining information for identification of print device context information may depend on, without limitation, the type of data or information (e.g., print device capabilities, print history data, location, etc.), type of context information, the mobile device capabilities, the type of communication link between the mobile device and the print device, and other such parameters.

For example, in an embodiment, the mobile device may access the database of print devices to determine, from the record of the print device, print device capabilities, user print history data for a print device, print device network information, and print device connectivity information. In another embodiment, if the print device(s) information is not available in the database of print devices, the mobile device may access another information sources such as print device websites, website corresponding to the location of the print device (e.g., library), etc. to retrieve print device context information. In certain other embodiments, the print device information may be stored in a look up service external to the print device and the print application may query the look up service. In some embodiments, the print application may infer print device capabilities from model information. Alternatively, the print application may consult an external directory to receive information regarding print device capabilities based on the print device model information.

Alternatively and/or additionally, the mobile device may establish an initiation communications link (such as via Bluetooth or NFC) with the print device to retrieve some or all of the information from the print device itself. The above process, in some embodiments, may require exchange of authentication or encryption data (e.g., username, password, etc.) to ensure security of the transmission. For example, in some embodiments, the application may derive the print device profile and information from an NFC tag attached to the print device where the print device model, data related to the capabilities of the print device (e.g. color versus monochrome, whether it supports duplex etc.), or any combination thereof is encoded in the NFC tag. In certain embodiments, the application may derive the print device information over a local and/or remote network by connecting directly to the print device. The network may represent, for example, the Internet or other wide area public or private network. The network may represent, in further examples, a corporate or other intranet, and/or a smaller-scale, local or personal network, any of which may be implemented using standard network technology. For new print device(s) that do not have a record in the database of print devices, the print application may save the identified print device context information.

In step 207, the print application may determine if the document can be printed at the print device. In an embodiment, the print application may process the identified document context, identified user context, and the identified print device context to determine if the document can be printed at the print device.

For example, in an embodiment, the mobile application analyze the print device capabilities (from the identified print device context information) and the document properties (such as format, color, size, etc. from the identified document context information) to determine if the print device is capable of printing the document.

Alternatively and/or additionally, the print application may analyze the identified document context including the security level and printing policy to determine if the document is allowed to be printed at the print device. For example, if the document is a photo with a low security level and privacy policy allowing it to be printed at any print device, the print application may determine that the print device is allowed to print the photo (provided print device capabilities are compatible). However, if the document is a bank document with document context identified as high security level and privacy policy allowing it to be printed only at particular locations (such as home and/or work location of the user), the print application may analyze the location and/or network information of the print device to determine whether or not it is allowed to print the bank statement. The print device may also use the user profile information (user context information) to determine the home and/or work location of the user. In an embodiment, a user may specify the security level associated with one or more print devices.

In yet another embodiment, the print application may use user preferences and/or past user history data corresponding to the print device to determine whether or not the document can be printed at the print device. For example, if a medium security level document was previously printed at the print device, the print application may determine that the current document with a medium security level document context may also be printed at the print device.

In an embodiment, the print application may also determine if any document in the client print queue can be printed 210 at the detected print device(s) using the principles discussed above with respect to step 207.

If the print application determines in step 207 and/or step 210 that the print device(s) is capable of printing a document, it may automatically output a notification to the user (for example, via the mobile device display). The notification may include, without limitation, information identifying the document(s), the print device(s), and a prompt stating that the document(s) can be printed at the print device(s). In an embodiment, the notification may also include other information such as, for example, cost of printing each document at each print device, total printing time (including wait times and processing times), location of the print device(s), print device(s) capabilities such as resolution, or other similar information. The user may then confirm the print device selection to print a document at the identified print device.

It should be noted that in the above method, a document to be printed is not bound to a print device or network of print devices until a user confirms the identified print device as the print device to be used thereby allowing greater flexibility to the user for printing documents (since the document is not sent to a print device queue till just before printing).

In certain embodiments, the mobile application may also generate context identification (user, document, and/or print device) and various determination rules by learning from previous user instructions and preferences, using methods and techniques known in the art. Additionally, the mobile application may continuously update the rules and user preferences.

The above types of context information (for document, user, and/or print device) and mechanisms for identification of context information are provided by way of example only and it will be understood to those skilled in the art that other types of context information and mechanisms for identification of the context information are within the scope of this disclosure.

If in step 207, it is determined that the detected print device(s) cannot print the document, the print application may save 208 the document to be printed in a client print queue locally and/or remotely.

The process may be repeated for identifying print devices capable of printing documents in the client print queue when the print application detects 209 a threshold change in the user context. Threshold change may be indicative of a threshold change in location of the mobile device and/or user. In an embodiment, the process may be repeated at fixed time intervals irrespective of the changes in user context.

Figure 3:
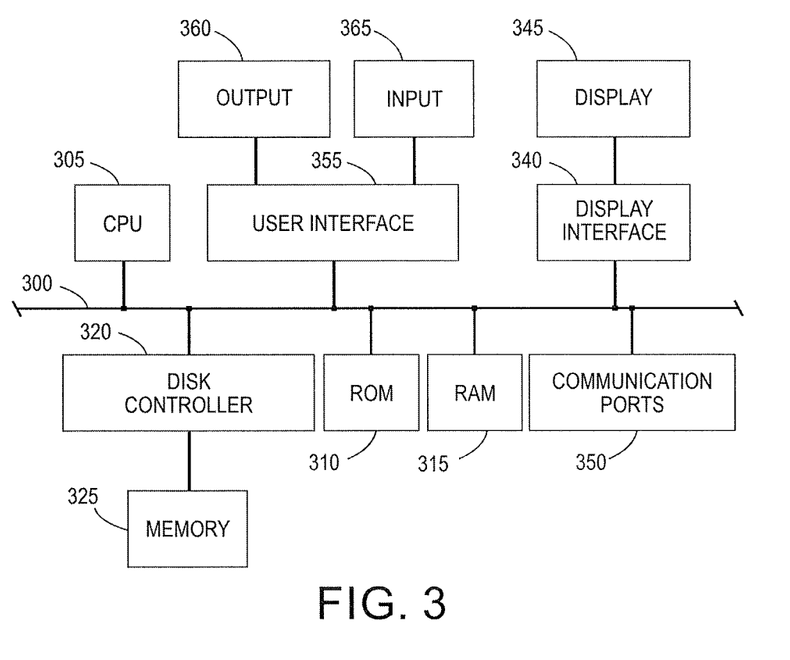
FIG. 3 depicts various embodiments of a mobile device for using the systems and processes described in this document.

The print method and process as described above may be performed and implemented by a mobile device having a processor and a communications interface. FIG. 3 depicts an example of internal hardware that may be used to contain or implement the various computer processes and systems as discussed above. For example, the mobile electronic device discussed above may include hardware such as that illustrated in FIG. 3. As such, the discussion provided below in relation to mobile device is sufficient for understanding the hardware and software architecture thereof. Notably, mobile device may include more or less components than those shown in FIG. 3. However, the components shown are sufficient to disclose an illustrative embodiment implementing the present invention. Some or all of the components of the mobile device can be implemented as hardware, software and/or a combination of hardware and software. The hardware includes, but is not limited to, one or more electronic circuits.

As shown in FIG. 3, an electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements, is a processing device, computing device or processor as such terms are used within this disclosure. A CPU or "processor" is a component of an electronic device that executes programming instructions. The term "processor" may refer either to a single processor or to multiple processors that together implement various steps of a process. Unless the context specifically states that a single processor is required or that multiple processors are required, the term "processor" includes both the singular and plural embodiments. Read only memory (ROM) 310 and random access memory (RAM) 315 constitute examples of memory devices. The term "memory device" and similar terms include single device embodiments, multiple devices that together store programming or data, or individual sectors of such devices.

A controller 320 interfaces with one or more optional memory devices 325 that service as date storage facilities to the system bus 300. These memory devices 325 may include, for example, an external or internal disk drive, a hard drive, flash memory, a USB drive or another type of device that serves as a data storage facility. As indicated previously, these various drives and controllers are optional devices. Additionally, the memory devices 325 may be configured to include individual files for storing any software modules or instructions, auxiliary data, incident data, common files for storing groups of contingency tables and/or regression models, or one or more databases for storing the information as discussed above.

The mobile device may include an RF antenna (not shown here) for receiving and transmitting Radio Frequency ("RF") signals. A receive/transmit switch may selectively couple the RF antenna to a transmitter circuitry and a receiver circuitry (not shown here) of the mobile device in a manner familiar to those skilled in the art. The receiver circuitry may demodulate and decodes the RF signals received from a network to derive information therefrom. The receiver circuitry may be coupled to the controller 320 and may provide the decoded signal information to the controller 320. The controller 320 may use the decoded RF signal information in accordance with the function(s) of the mobile device.

The controller 320 may also provide information to the transmitter circuitry for encoding and modulating information into RF signals, and the transmitter circuitry may communicate the RF signals to the RF antenna for transmission to an external device via the receive/transmit switch.

The mobile device may also include a GPS antenna (not shown here) coupled to Global Positioning System ("GPS") receiver circuitry (not shown here) for receiving GPS signals. The GPS receiver circuitry may demodulate and decode the GPS signals to extract GPS location information therefrom. The GPS location information may indicate the location of the mobile device. The GPS receiver circuitry may provide the decoded GPS location information to the controller 320, that may use the decoded GPS location information in accordance with the function(s) of the mobile device. For example, the GPS location information may be used by the mobile device to automatically identify the location of a user, as discussed above.

Program instructions, software or interactive modules, decoded RF signal information, the decoded GPS, or other information (e.g., such as authentication information, cryptographic information, user context information, document context information, print device context information and various logic information) for performing any of the functional steps associated with the processes as described above may be stored in the ROM 310 and/or the RAM 315. Optionally, the program instructions may be stored on a non-transitory, computer readable medium such as a compact disk, a digital disk, flash memory, a memory card, a USB drive, an optical disc storage medium, and/or other recording medium.

The system may also include a user interface 355 which allows for receipt of data from input devices 365 such as a keyboard, a mouse, a joystick, a touchscreen, a display, a remote control, a pointing device, a video input device and/or an audio input device. The user interface 355 configured to allow a user to interact with and control software applications (e.g., print application and other software applications) installed on the mobile device. The user interface may also include output devices 360 such as a speaker, a display, and/or other output devices.

An optional display interface 340 may permit information from the bus 300 to be displayed on the display 345 in audio, visual, graphic or alphanumeric format. Communication with external devices may occur using various communication ports 350. A communication port 350 may be attached to a communications network, such as the Internet, a local area network or a cellular telephone data network.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for printing a document from a mobile device comprising:
   a non-transitory, computer readable memory;
   one or more processors; and
   a computer-readable medium containing programming instructions that, when executed by the one or more processors, cause the system to:
   identify a document to be printed, and
   generate a notification comprising a selection of at least one candidate print device that may be selected for printing the document by:
   analyzing, by one or more mobile applications of the mobile device, the document to be printed to identify a document context, wherein the identified document context comprises at least a security level of the identified document, using data sensed by one or more location sensors of the mobile device to identify a user context, wherein the user context comprises at least a current geographical location of a user, using the user context to detect a print device near the geographical location of the user, accessing a rule set to determine if the identified document can be printed on the detected print device based on the identified document context comprising the security level of the identified document by:

identifying, from the one or more mobile applications, a mobile application being used to print the identified document, identifying a format associated with the identified document based on the identified mobile application, identifying an intended use of the identified document based on the identified format, and using the intended use to identify the security level of the identified document, generating the notification comprising the selection of at least one candidate print device that may be selected for printing the document, by including the detected print device in the selection of at least one candidate print device, and causing a user interface to output the notification.

2. The system of claim 1, further comprising programming instructions, that when executed by the one or more processors, cause the system to save the document and the document context associated with the document to a client print queue, if the document cannot be printed on the print device.

3. The system of claim 1, further comprising programming instructions, that when executed by the one or more processors, cause the system to:

detect a threshold change in the geographical location of the user;

update the user context to a new user context comprising a new geographical location of the user;

use the new user context to detect a first print device;

for each document in the client print queue, determine, whether the document can be printed on the first print device using at least a document context for each document; and generate the notification comprising the selection of at least one candidate print device that may be selected for printing the document, by including the first print device and an identification of at least one document that can be printed on the first print device in the selection of at least one candidate print device.

4. The system of claim 1, wherein the programming instructions, that when executed by the one or more processors, cause the system to generate a notification comprising a selection of at least one candidate print device that may be selected for printing the document by accessing a rule set to determine if the identified document can be printed on the detected print device further comprise one or more instructions to identify a printing policy associated with the identified document based on the security level, wherein the printing policy comprises a listing of locations where the identified document can be printed.

5. The system of claim 1, wherein the one or more location sensors comprise at least one of the following: one or more sensors associated with a global positioning system, one or more sensors associated with a Wi-Fi based positioning system, one or more sensors associated with a micro-location sensor, or one or more imaging sensors.

6. The system of claim 1, wherein the programming instructions, that when executed by the one or more processors, cause the system to generate a notification comprising a selection of at least one candidate print device that may be selected for printing the document by analyzing the document to be printed to identify a document context further comprise one or more instructions to:

identify a folder name of a folder associated with the identified document and access the rule set to identify the intended use based on the folder name.

7. The system of claim 1, wherein the programming instructions, that when executed by the one or more processors, cause the system to generate a notification comprising a selection of at least one candidate print device that may be selected for printing the document by analyzing the document to be printed to identify a document context further comprise one or more instructions to:

identify a plurality of keywords in the identified document; and use the plurality of keywords to identify the security level of the identified document.

8. The system of claim 1, wherein the programming instructions, that when executed by the one or more processors, cause the system to generate a notification comprising a selection of at least one candidate print device that may be selected for printing the document by using data sensed by one or more location sensors of the mobile device to identify a user context further comprise instructions to identify context information relating to at least one of the following:

user preference information, user print history data, user profile, or user identity.

9. A method for printing a document from a mobile device comprising:

by a processor of the mobile device, identifying a document to be printed; and by the processor, generating a notification comprising a selection of at least one candidate print device that may be selected for printing the document by:

analyzing, by one or more mobile applications of the mobile device, the document to be printed to identify a document context, wherein the identified document context comprises at least a security level of the identified document, using data sensed by one or more location sensors of the mobile device to identify a user context, wherein the user context comprises at least a current geographical location of a user, using the user context to detect a print device near the geographical location of the user, accessing a rule set to determine if the identified document can be printed on the detected print device based on the identified document context comprising the security level of the identified document by:

identifying, from the one or more mobile applications, a mobile application being used to print the identified document, identifying a format associated with the identified document based on the identified mobile application, identifying an intended use of the identified document based on the identified format, and using the intended use to identify the security level of the identified document, generating the notification comprising the selection of at least one candidate print device that may be selected for printing the document, by including the detected print device in the selection of at least one candidate print device, and causing a user interface of the mobile device to output the notification.

10. The method of claim 9, further comprising saving the document and the document context associated with the document to a client print queue, if the document cannot be printed on the print device.

11. The method of claim 9, further comprising, by the processor:

detecting a threshold change in the geographical location of the user;

updating the user context to a new user context comprising a new geographical location of the user;

using the new user context to detect a first print device;

for each document in the client print queue, determining, whether the document can be printed on the first print device using at least a document context for each document; and generating the notification comprising the selection of at least one candidate print device that may be selected for printing the document, by including the first print device and an identification of at least one document that can be printed on the first print device in the selection of at least one candidate print device.

12. The method of claim 9, wherein accessing a rule set to determine if the identified document can be printed on the detected print device further comprises identifying a printing policy associated with the identified document based on the security level, wherein the printing policy comprises a listing of locations where the identified document can be printed.

13. The method of claim 9, wherein the one or more location sensors comprise at least one of the following: one or more sensors associated with a global positioning system, one or more sensors associated with a Wi-Fi based positioning system, one or more sensors associated with a micro-location sensor, or one or more imaging sensors.

14. The method of claim 9, wherein analyzing the document to be printed to identify a document context further comprises:

identifying a folder name of a folder associated with the identified document and accessing the rule set to identify the intended use based on the folder name.

15. The method of claim 9, analyzing the document to be printed to identify a document context further comprises:

identifying a plurality of keywords in the identified document; and using the plurality of keywords to identify the security level of the identified document.

16. The method of claim 9, wherein using data sensed by one or more location sensors of the mobile device to identify a user context further comprise instructions to identify context information relating to at least one of the following:

user preference information,
user print history data,
user profile, or
user identity.

* * * * *